United States Patent [19]  
Kirchner

[11] 3,711,610  
[45] Jan. 16, 1973

[54] ANTICOCCIDIOSIS METHOD AND COMPOSITIONS INVOLVING INDAZOLYLPHENYLUREAS AND INDAZOLYLPHENYLTHIOUREAS

[75] Inventor: Frederick K. Kirchner, Bethlehem, N.Y.

[73] Assignee: Sterling Drug Inc., New York, N.Y.

[22] Filed: June 1, 1971

[21] Appl. No.: 149,018

Related U.S. Application Data

[62] Division of Ser. No. 859,569, Sept. 19, 1969, Pat. No. 3,647,819.

[52] U.S. Cl. ................................................424/273
[51] Int. Cl. ............................................A61k 27/00
[58] Field of Search ..................260/310 C; 424/273

[56] References Cited

UNITED STATES PATENTS 3,318,905   5/1967   Palazzo ........................... 260/310 C
3,520,901   7/1970   Massaroli ........................... 424/273

Primary Examiner—Sam Rosen
Attorney—Elmer J. Lawson, B. Woodrow Wyatt, Thomas L. Johnson, Robert K. Bair, William G. Webb, Frederik W. Stonner, Roger T. Wolfe and Lynn T. Fletcher

[57] ABSTRACT

A series of indazolylphenylureas and indazolylphenylthioureas, useful for preventing and suppressing coccidiosis in poultry, are prepared by the condensation of an aminoindazole and a phenylisocyanate or a phenylisothiocyanate.

3 Claims, No Drawings

ANTICOCCIDIOSIS METHOD AND COMPOSITIONS INVOLVING INDAZOLYLPHENYLUREAS AND INDAZOLYLPHENYLTHIOUREAS

This application is a division of my prior copending application Ser. No. 859,569, filed Sept. 19, 1969 now U.S. Pat. No. 3,647,819.

This invention relates to compounds, methods and compositions useful in the prevention and suppression of coccidiosis in poultry. More particularly the useful compounds of this invention are indazolylphenylureas and indazolylphenylthioureas.

Coccidiosis, a disease of great economic importance because of its epidemic nature and its destructiveness to poultry, is caused by protozoan organisms known as coccidia, and in particular, by certain species of the genus Eimeria. Coccidia gain access to the host by way of ingested food, drinking water, or soil contaminated with oocysts which are found in fecal droppings of fowl harboring the parasites. The coccidia multiply in the gastro-intestinal tract and erode the epithelial tissues of the cecum and intestines, causing hemorrhage, weakness, emaciation and digestive disturbances. The fowl which survive severe infections are left in a state of debilitation which substantially reduces their market value.

Of the numerous remedies which have been suggested for the control of coccidiosis, many are too inefficient, prohibitively expensive, or too toxic for prophylactic administration. Moreover, with the previously available remedies there may be encountered such metabolic difficulties as poisoning of the hematopoietic system and a subsequent reduction in the number of red and white blood cells, adverse effect on fertility, color, taste, or odor of eggs produced by the birds, and unpalatability of the flesh of the birds. The need for new and improved means for controlling coccidial infections in poultry has therefore remained a serious problem in the poultry industry.

It is an object of this invention to provide novel compounds which are useful as anticoccidial agents when administered to poultry in prophylactic quantities. It is another object of this invention to provide a new and useful method for the control of coccidiosis in poultry. It is still another object of this invention to provide novel feed compositions useful for the prevention and suppression of coccidiosis in poultry.

In accordance with the present invention I have discovered that coccidiosis in poultry can be prevented and suppressed by administering to the poultry, preferably in combination with the poultry feed, a small quantity of an indazolylphenylurea or an indazolylphenylthiourea of the formula

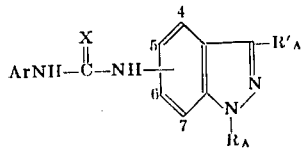

(A)

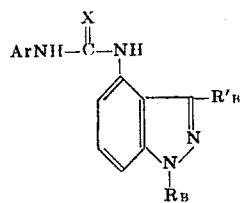

(B)

or

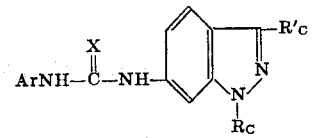

(C)

where Ar is phenyl or phenyl substituted by one or two members of the group consisting of halo, lower-alkoxy, lower-alkyl and nitro, where X is O or S, where $R_A$ and $R_A'$ are H, where $R_B$ and $R_C$ are phenyl or phenyl substituted by one or two members of the group consisting of halo, lower-alkoxy and lower-alkyl and where $R_B'$ and $R_C'$ are H or lower-alkoxycarbonyl.

The halo substituents of Formulas A, B and C can be any of fluoro, chloro, bromo and iodo. The lower-alkoxy substituents of Formulas A, B and C can be any lower-alkoxy of one to four carbon atoms, including methoxy, ethoxy, propoxy, isopropoxy, butoxy, sec-butoxy, isobutoxy and tert-butoxy. The lower-alkyl substituents of Formulas A, B and C can be any lower-alkyl of one to four carbon atoms, including methyl, ethyl, propyl, isopropyl, butyl, sec-butyl, isobutyl and tert-butyl. The lower-alkoxycarbonyl substituents of Formulas A, B and C can be any of methoxycarbonyl, ethoxycarbonyl, propoxycarbonyl, isopropoxycarbonyl, butoxycarbonyl, sec-butoxycarbonyl, isobutoxycarbonyl and tert-butoxycarbonyl.

Synthesis of the indazolylphenylureas and indazolylphenylthioureas of Formulas A, B and C can be accomplished by condensing aminoindazoles of the formulas

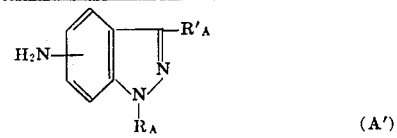

(A')

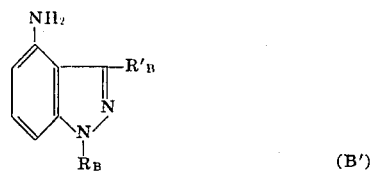

(B')

and

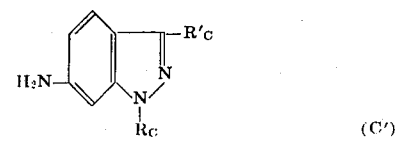

(C')

respectively, with phenylisocyanates or phenylisothiocyanates of the formula Ar—N=C=X in a diluent such as acetonitrile, benzene, ethanol, tetrahydrofuran or toluene with or without external heating. The crystalline products of this condensation can be purified by recrystallization.

The phenylisocyanates and phenylisothiocyanates of the formula Ar—N=C=X are a known class of compounds which can be prepared by known synthetic methods. Phenylisocyanates of the formula Ar—N=C=O can be prepared, for example, by passing carbonyl chloride into hot solutions of the corresponding anilines (ArNH₂) in toluene, saturated with hydrogen chloride. Synthesis of phenylisothiocyanates of the formula Ar—N=C=S can be accomplished, for example, by treating the corresponding ammonium phenyldithiocarbamates, prepared in turn from the corresponding anilines, carbon disulfide and ammonia, with lead nitrate. Many of these phenylisocyanates and phenylisothiocyanates are commercially available.

The intermediates of Formulas A', B' and C' are also known classes of compounds, which are available by the known synthetic routes illustrated in Charts I–III. Some of these intermediates are commercially available.

The intermediates of Formula A' can be synthesized by the route shown in Chart I. Since all of the four possible nitro-2-toluidines are known compounds, this route provides all of the four possible corresponding intermediates of Formula A'. Thus the arylureido or arylthioureido (ArNHC(=X)NH) substitution of Formula A can be at any of the 4,5,6 or 7-positions of the indazole nucleus.

CHART I

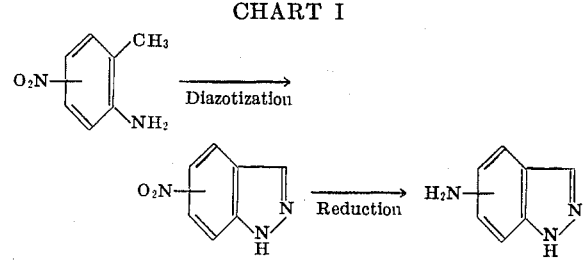

Synthesis of the intermediates of Formulas B' and C' is accomplished by the routes shown in Charts II and III. Chart II illustrates the route for the intermediates of Formula B' in which $R_B'$ is H. By substituting 2,4-dinitrobenzaldehyde for 2,6-dinitrobenzaldehyde and $H_2NNHR_C$ for $H_2NNHR_B$, the route of Cart II provides the intermediates of Formula C' in which $R_C'$ is H. Both 2,4-dinitrobenzaldehyde and 2,6-dinitrobenzaldehyde are known compounds. The phenylhydrazines $H_2NNHR_B$ and $H_2NNHR_C$ are a know class of compounds which can be prepared by known synthetic methods. They can be prepared, for example, by diazotizing the corresponding anilines ($H_2NR_B$ and $H_2NR_C$) and reducing the resulting diazonium salts with sodium sulfite. Many of them are commercially available.

CHART II

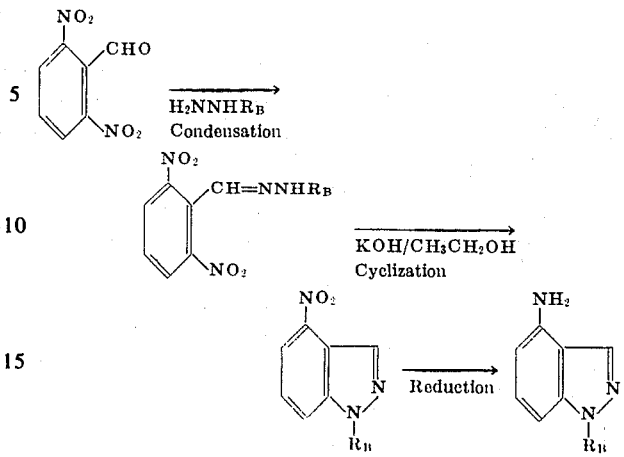

Chart III illustrates the route of synthesis for the intermediates of Formula C' in which $R_C'$ is lower-alkoxycarbonyl (COOR). By substituting methyl 2-(2,6-dinitrophenyl)acetate for methyl 2-(2,4-dinitrophenyl)acetate and $R_BNH_2$ for $R_CNH_2$ the route of Chart III provides the intermediates of Formula B' in which $R_B'$ is lower-alkoxycarbonyl (COOR). Methyl 2-(2,4-dinitrophenyl)acetate and methyl 2-(2,6-dinitrophenyl)acetate are known compounds. The anilines $R_CNH_2$ and $R_BNH_2$ are a known class of compounds which can be prepared by known synthetic methods. They can be obtained, for example, by hydrogenation of the corresponding nitrobenzenes ($R_CNO_2$ and $R_BNO_2$) over palladium-on-carbon.

CHART III

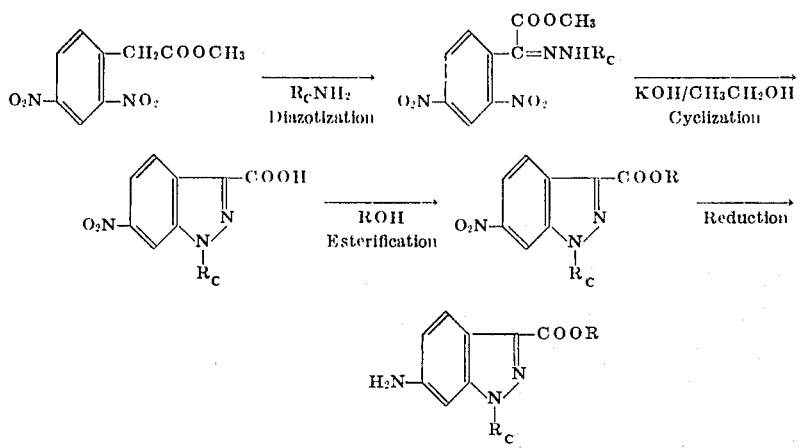

The steps of Charts I–III are conventional synthetic operations. The reduction steps can be catalytic hydrogenations, for example, hydrogenation over palladium-on-carbon as the catalyst, or chemical reductions, for example, reduction with zinc in aqueous-ethanolic hydrochloric acid. The esterification step of Chart III can be achieved by using the alcohol ROH, for example, methanol, where R is methyl, and dry hydrogen chloride as the catalyst. Esterification for the case in which R is tert-butyl can be accomplished by using isobutene and a strongly acidic catalyst such as concentrated sulfuric acid in an inert solvent such as ether under dry conditions.

The structures of the indazolylphenylureas and indazolylphenylthioureas of Formulas A, B and C of this invention are determined by their method of synthesis and are corroborated by infra-red spectral analysis and by the correspondence of calculated and found values of elemental analysis of representative samples.

Effectiveness of the indazolylphenylureas and indazolylphenylthioureas of Formulas A, B and C in the prevention and suppression of coccidiosis in poultry can be demonstrated as follows. A compound of Formula A, B or C is administered to the poultry in the poultry feed at a concentration of 0.005–0.2 percent by weight. The poultry are then infected with one to nine species of the coccidial genus Eimeria. Effectiveness of this compound in preventing or suppressing the coccidial infections is measured by tallying mortality or weight gain of the poultry and/or by counting upper intestinal and/or cecal lesions in the poultry at autopsy. These results are compared with the corresponding observations of infected poultry which receive no compound of Formula A, B or C in the poultry feed. Infected poultry treated with a compound of Formula A, B or C show lower mortality rates or higher weight gain and/or fewer upper intestinal and/or cecal lesions than infected poultry not treated with a compound of Formula A, B or C.

The following examples illustrate specific embodiments of my invention.

EXAMPLE 1

Hot (89° C.) solutions of 4-amino-1H-indazole (8.60 g., 0.0645 mole) in toluene (425 ml.) and of 4-nitrophenylisocyanate (11.5 g., 0.0700 mole) in toluene (35 ml.) were combined. An orange solid began to separate immediately from the resulting solution. The mixture was allowed to cool during five hours and was stirred occasionally. The solid was collected, triturated with hot benzene, and recrystallized twice from N,N-dimethylformamide-methanol. There was thus obtained yellow crystals of 1-[4-(1H-indazolyl)]-3-(4-nitrophenyl)urea (9.14 g., m.p. 271.0° – 274.2° C.).

EXAMPLE 2

In a manner similar to that of Example 1 condensation of 5-amino-1H-indazole and 4-nitrophenylisocyanate in toluene as the diluent gave a solid, recrystallization of which from 2-ethoxyethanol-water afforded yellow crystals of 1-[5-(1H-indazolyl)]-3-(4-nitrophenyl)urea (m.p. > 300° C.).

In one test for anticoccidial activity 1-[5-(1H-indazolyl)-3-(4-nitrophenyl)]urea was administered at four levels in the feed to groups of 12, 4-week old chicks beginning at day one. At day three each chick of all but two groups of the chicks was infected with 30,000 oocysts of *Eimeria tenella*, 30,000 oocysts of *Eimeria maxima*, 30,000 oocysts of *Eimeria necatrix*, 30,000 oocysts of *Eimeria brunetti*, 400,000 oocysts of *Eimeria hagani* and 600,000 oocysts of *Eimeria acervulina*. Daily medicated feeding was continued and mortality and weights were tallied until day seventeen. Two groups of infected and unmedicated chicks served as infected controls. The two groups of uninfected and unmedicated chicks served as uninfected controls. The following results show the preventive and suppressive effect of the compound on the coccidial infection.

| Drug Level (%) | Weight Gain (g.) At Day Seventeen | Mortality |
|---|---|---|
| None (uninfected control) | 389 | 0 |
| None (uninfected control) | 372 | 0 |
| None (infected control) | 153 | 3 |
| None (infected control) | 208 | 3 |
| 0.00625 | 229 | 0 |
| 0.00625 | 202 | 1 |
| 0.0125 | 245 | 1 |
| 0.0125 | 283 | 2 |
| 0.025 | 256 | 1 |
| 0.025 | 280 | 1 |
| 0.05 | 301 | 1 |
| 0.05 | 314 | 0 |

In a second test for anticoccidial activity 1-[5-(1H-indazolyl-3-(4-nitrophenyl)]urea was administered at three levels in the feed to groups of 10, 2-week old chicks beginning at day one. At day two each of the chicks was infected with 100,000 oocysts of *Eimeria tenella*. After continued daily medicated feeding the chicks were sacrificed at day seven. The lesions were scored. Two groups of infected and unmedicated checks served as infected controls. In the results which follow the lesion score indicates the degree of infection. A score of 0 percent would indicate no infection. A score of 100 percent would indicate complete infection.

| Drug Level(%) | Lesion Score (%) |
|---|---|
| None (infected control) | 35 |
| None (infected control) | 30 |
| 0.0125 | 25 |
| 0.025 | 7.5 |
| 0.05 | 10 |

EXAMPLE 3

In a manner similar to that of Example 1 condensation of 6-amino-1H-indazole and 4-nitrophenylisocyanate in benzene-tetrahydrofuran as the diluent gave a solid, recrystallization of which from N,N-dimethylformamide-methanol-water afforded light-yellow crystals of 1-[6-(1H-indazolyl)]-3-(4-nitrophenyl)urea (m.p. 273.0°–281.0° C.).

EXAMPLE 4

In a manner similar to that of Example 1 condensation of 7-amino-1H-indazole and 4-nitrophenylisocyanate in benzene as the diluent gave a solid, recrystallization of which from N,N-dimethylformamide-ethanol afforded tan crystals of 1-[7-(1H-indazolyl)]-3-(4-nitrophenyl)urea (m.p. 258.0° – 260.0° C.).

EXAMPLE 5

In a manner similar to that of Example 1 condensation of 5-amino-1H-indazole and 4-chlorophenylisocyanate in acetonitrile as the diluent gave a solid, recrystallization of which from N,N-dimethylformamide-methanol afforded pale-pink crystals of 1-[5-(1H-indazolyl)]-3-(4-chlorophenyl)urea (m.p. > 300° C.).

In the foregoing example by replacing 4-chlorophenylisocyanate by 4-fluorophenylisocyanate, 3-bromophenylisocyanate, 4-iodophenylisocyanate, 4-methoxyphenylisocyanate and 4-butoxyphenylisocyanate there can be obtained, respectively, 1-[5-(1H-indazolyl)]-3-(4-fluorophenyl)urea, 1-[5-(1H-indazolyl)]-3-(3-bromophenyl)urea, 1-[5-(1H-indazolyl)]-3-(4-iodophenyl)urea, 1-[5-(1H-indazolyl)]-3-(4-methoxyphenyl)-urea and 1-[5-(1H-indazolyl)]-3-(4-butoxyphenyl)urea.

EXAMPLE 6

In a manner similar to that of Example 1 condensation of 5-amino-1H-indazole and 2,5-dichlorophenylisocyanate in acetonitrile as the diluent gave a solid, recrystallization of which from N,N-dimethylformamide-methanol afforded pale-pink crystals of 1-[5-(1H-indazolyl)]-3-(2,5-dichlorophenyl)urea (m.p. > 300°C.).

In the foregoing example by replacing 2,5-dichlorophenylisocyanate by 4-bromo-2-chlorophenylisocyanate, 5-chloro-2-methoxyphenylisocyanate, 3-chloro-2-methylphenylisocyanate, 2-bromo-4-nitrophenylisocyanate, 3,4-dimethoxyphenylisocyanate, 2-methoxy-5-methylphenylisocyanate, 4-methoxy-3-nitrophenylisocyanate, 2,4-diethylphenylisocyanate, 4-methyl-3-nitrophenylisocyanate and 3,5-dinitrophenylisocyanate there can be obtained, respectively,
1-[5-(1H-indazolyl)]-3-(4-bromo-2-chlorophenyl)urea,
1-[5-(1H-indazolyl)]-3-(5-chloro-2-methoxyphenyl)urea,
1-[5-(1H-indazolyl)]-3-(3-chloro-2-methylphenyl)urea,
1-[5-(1H-indazolyl)]-3-(2-bromo-4-nitrophenyl)urea,
1-[5-(1H-indazolyl)]-3-(3,4-dimethoxyphenyl)urea,
1-[5-(1H-indazolyl)]-3-(2-methoxy-5-methylphenyl)urea,
1-[5-(1H-indazolyl)]-3-(4-methoxy-3-nitrophenyl)urea,
1-[5-(1H-indazolyl)]-3-(2,4-diethylphenyl)urea,
1-[5-(1H-indazolyl)]-3-(4-methyl-3-nitrophenyl)urea and
1-[5-(1H-indazolyl)]-3-(3,5-dinitrophenyl)urea.

EXAMPLE 7

In a manner similar to that of Example 1 condensation of 5-amino-1H-indazole and 4-methylphenylisocyanate in acetonitrile as the diluent gave a solid, recrystallization of which from N,N-dimethylformamide-ethanol afforded pink crystals of 1-[5-(1H-indazolyl)]-3-(4-methylphenyl)urea (m.p. > 300°C.).

In the foregoing example by replacing 4-methylphenylisocyanate by phenylisocyanate and 4-(tert-butyl)phenylisothiocyanate there can be obtained, respectively, 1-[5-(1H-indazolyl)]-3-phenylurea and 1-[5-(1H-indazolyl)]-3-[4-(tert-butyl)phenyl]-2-thiourea.

EXAMPLE 8

In a manner similar to that of Example 1 condensation of 5-amino-1H-indazole and 2-nitrophenylisocyanate in benzene-tetrahydrofuran as the diluent gave a solid, recrystallization of which from N,N-dimethylformamide-methanol afforded yellow crystals of 1-[5-(1H-indazolyl)]-3-(2-nitrophenyl)urea (m.p. > 300°C.).

EXAMPLE 9

In a manner similar to that of Example 1 condensation of 5-amino-1H-indazole and 3-nitrophenylisocyanate in benzene-tetrahydrofuran as the diluent gave a solid, recrystallization of which from N,N-dimethylformamide-methanol-water afforded off-white crystals of 1-[5-(1H-indazolyl)]-3-(3-nitrophenyl)urea (m.p. 268.6°–281.2°C.).

EXAMPLE 10

In a manner similar to that of Example 1 condensation of 5-amino-1H-indazole and 4-chlorophenylisothiocyanate in absolute ethanol as the diluent gave a solid, recrystallization of which from acetone afforded off-white crystals of 1-[5-(1H-indazolyl)]-3-(4-chlorophenyl)-2-thiourea (m.p. 252.6°–255.6°C.).

In the foregoing example by replacing 5-amino-1H-indazole by 1-phenyl-6-amino-1H-indazole, 1-(4-bromo-2-chlorophenyl)-6-amino-1H-indazole, 1-(5-chloro-2-methoxyphenyl)-6-amino-1H-indazole, 1-(3-chloro-2-methylphenyl)-6-amino-1H-indazole, 1-(3,4-dimethoxyphenyl)-6-amino-1H-indazole, 1-(2-methoxy-5-methylphenyl)-6-amino-1H-indazole and 1-(2,4-diethylphenyl)-6-amino-1H-indazole there can be obtained, respectively, 1-[1-phenyl-6-(1H-indazolyl)]-3-(4-chlorophenyl)-2-thiourea, 1-[1-(4-bromo-2-chlorophenyl)-6-(1H-indazolyl)]-3-(4-chlorophenyl)-2-thiourea, 1-[1-(5-chloro-2-methoxyphenyl)-6-(1H-indazolyl)]-3-(4-chlorophenyl)-2-thiourea, 1-[1-(3-chloro-2-methylphenyl)-6-(1H-indazolyl)]-3-(4-chlorophenyl)-2-thiourea, 1-[1-(3,4-dimethoxyphenyl)-6-(1H-indazolyl)]-3-(4-chlorophenyl)-2-thiourea, 1-[1-(2-methoxy-5-methylphenyl)-6-(1 H-indazolyl)]-3-(4-chlorophenyl)-2-thiourea and 1-[1-(2,4-diethylphenyl)-6-(1H-indazolyl)]-3-(4-chlorophenyl)-2-thiourea.

EXAMPLE 11

In a manner similar to that of Example 1 condensation of 1-phenyl-3-methoxycarbonyl-6-amino-1H-indazole (prepared by hydrogenation of 1-phenyl-3-methoxycarbonyl-6-nitro-1H-indazole over palladium-on-carbon (m.p. 110°–112°C.) and 4-chlorophenylisocyanate in benzene as the diluent gave a solid, recrystallization of which from N,N-dimethylformamide afforded cream-colored crystals of 1-[1-phenyl-3-methoxycarbonyl-6-(1H-indazolyl)]-3-(4-chlorophenyl)urea (m.p. 250.6°–252.0°C.).

In the foregoing example by replacing 1-phenyl-3-methoxycarbonyl-6-amino-1H-indazole by 1-phenyl-3-methoxy-carbonyl-4-amino-1H-indazole, 1-(3-chlorophenyl)-3-methoxy-carbonyl-4-amino-1H-indazole, 1-(4-methoxyphenyl)-3-methoxy-carbonyl-4-amino-1H-indazole, 1-(4-isopropoxyphenyl)-3-isopropoxycarbonyl-4-amino-1H-indazole, 1-(4-methylphenyl)-3-methoxycarbonyl-4-amino-1H-indazole and 1-(4-isopropylphenyl)-3-isopropoxycarbonyl-4-amino-1H-indazole, there can be obtained, respectively, 1-[1-phenyl-3-methoxycarbonyl-4-(1H-indazolyl)]-3-(4-chlorophenyl)urea, 1-[1-(3-chlorophenyl)-3-methoxycarbonyl-4-(1H-indazolyl)]-3-(4-chlorophenyl)urea, 1-[1-(4-methoxyphenyl)-3-methoxycarbonyl-4-(1H-indazolyl)]-3-(4-chlorophenyl)urea, 1-[1-(4-isopropoxyphenyl)-3-isopropoxycarbonyl-4-(1H-indazolyl)]-3-(4-chlorophenyl)urea, 1-[1-(4-methylphenyl)-3-methoxy-carbonyl-4-(1H-indazolyl)]-3-(4-chlorophenyl)urea and 1-([1-(4-isopropylphenyl)-3-isopropoxycarbonyl-4-(1H-indazolyl)]-3-(4-chlorophenyl)urea.

EXAMPLE 12

In a manner similar to that of Example 1 condensation of 1-phenyl-3-methoxycarbonyl-6-amino-1H-indazole and 4-nitrophenylisocyanate in benzene as the diluent afforded a solid, recrystallization of which from pyridine afforded yellow crystals of 1-[1-phenyl-3-methoxycarbonyl-6-(1H-indazolyl)]-3-(4-nitrophenyl)urea (m.p. 260.4°–277.6° C.).

EXAMPLE 13

In a manner similar to that of Example 1 condensation of 1-phenyl-3-methoxycarbonyl-6-amino-1H-indazole and 4-chlorophenylisothiocyanate in absolute ethanol as the diluent gave an off-white solid, recrystallization of which from absolute ethanol afforded off-white crystals of 1-[1-phenyl-3-methoxycarbonyl-6-(1H-indazolyl)]-3-(4-chlorophenyl)-2-thiourea (m.p. 172.2°–173.6° C.).

I claim:

1. The method for the prevention and suppression of coccidiosis in poultry which comprises administering to the poultry a compound of the formula

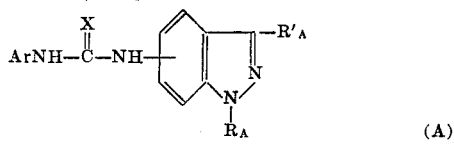

(A)

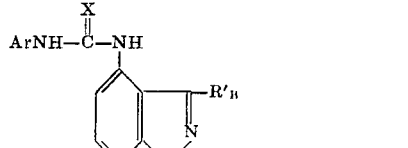

(B)

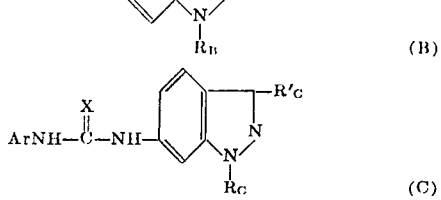

(C)

where Ar is phenyl or phenyl substituted by one or two members of the group consisting of halo, lower-alkoxy, lower-alkyl and nitro, where X is O or S, where $R_A$ and $R_A'$ are H, where $R_B$ and $R_C$ are phenyl or phenyl substituted by one or two members of the group consisting of halo, lower-alkoxy and lower-alkyl and where $R_B'$ and $R_C'$ are H or lower-alkoxycarbonyl.

2. A composition for the prevention and suppression of coccidiosis in poultry which comprises poultry feed having dispersed therein as an effective anticoccidial ingredient a compound of the formula

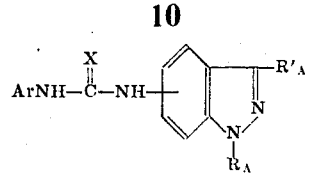

(A)

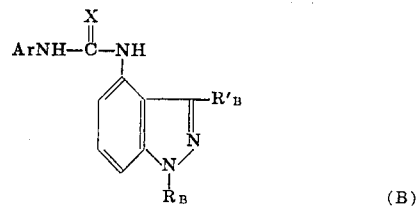

(B)

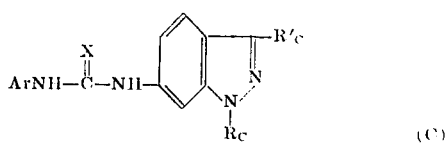

(C)

where Ar is phenyl or phenyl substituted by one or two members of the group consisting of halo, lower-alkoxy, lower-alkyl and nitro, where X is O or S, where $R_A$ and $R_A'$ are H, where $R_B$ and $R_C$ are phenyl or phenyl substituted by one or two members of the group consisting of halo, lower-alkoxy and lower-alkyl and where $R_B'$ and $R_C'$ are H or lower-alkoxycarbonyl.

3. A poultry feed containing from 0.005 to 0.2 percent by weight of a compound of the formula

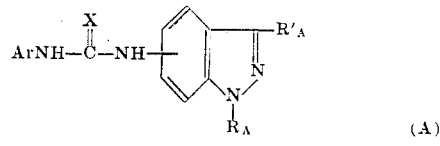

(A)

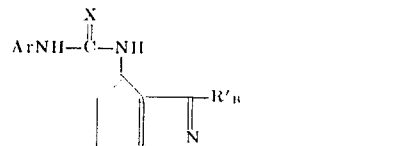

(B)

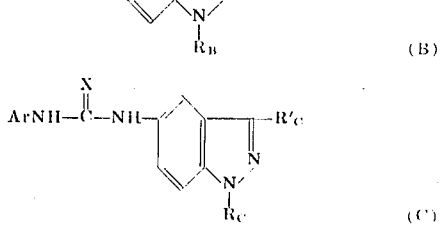

(C)

where Ar is phenyl or phenyl substituted by one or two members of the group consisting of halo, lower-alkoxy, lower-alkyl and nitro, where X is O or S, where $R_A$ and $R_A'$ are H, where $R_B$ and $R_C$ are phenyl or phenyl substituted by one or two members of the group consisting of halo, lower-alkoxy and lower-alkyl and where $R_B'$ and $R_C'$ are H or lower-alkoxycarbonyl.

* * * * *